United States Patent
Yang et al.

(10) Patent No.: US 11,806,909 B2
(45) Date of Patent: Nov. 7, 2023

(54) BIAXIALLY ORIENTED POLYESTER FILM AND MANUFACTURING METHOD THEREOF

(71) Applicant: NAN YA PLASTICS CORPORATION, Taipei (TW)

(72) Inventors: Wen-Cheng Yang, Taipei (TW); Chen An Wu, Taipei (TW); Chun-Cheng Yang, Taipei (TW); Chia-Yen Hsiao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 91 days.

(21) Appl. No.: 17/320,247

(22) Filed: May 14, 2021

(65) Prior Publication Data

US 2022/0193971 A1 Jun. 23, 2022

Related U.S. Application Data (60) Provisional application No. 63/129,522, filed on Dec. 22, 2020.

(30) Foreign Application Priority Data

Apr. 12, 2021 (TW) .................................. 110113065

(51) Int. Cl.
*B29C 48/00* (2019.01)
*B29C 48/88* (2019.01)
(Continued)

(52) U.S. Cl.
CPC ........ *B29C 48/0018* (2019.02); *B29C 48/022* (2019.02); *B29C 48/9165* (2019.02);
(Continued)

(58) Field of Classification Search
CPC ... B29C 55/085; B29C 51/04; B29C 44/5627; B29C 2043/3631; B29C 49/08; B29C 45/581; B29C 45/0013; B29C 48/0018
See application file for complete search history.

(56) References Cited

U.S. PATENT DOCUMENTS

2015/0322217 A1* 11/2015 Jung ........................ C08J 3/203
523/223
2016/0130415 A1 5/2016 Miyasaka

FOREIGN PATENT DOCUMENTS

EP 2799469 11/2014
JP H1058523 3/1998
(Continued)

OTHER PUBLICATIONS

"Office Action of Japan Counterpart Application", dated Jun. 21, 2022, p. 1-p. 3.
(Continued)

*Primary Examiner* — Stella K Yi
(74) *Attorney, Agent, or Firm* — JCIPRNET (57) ABSTRACT

A biaxially oriented polyester film having the following physical property is provided: when cooled from the molten state at a cooling rate of 20° C./min, an observed recrystallization temperature is 175° C.-200° C. The biaxially oriented polyester film is formed by a thick sheet before bidirectional stretching that is melted and extruded by an extruder and then cooled and formed on a casting roll. The thick sheet before stretching having the following physical property as analyzed by differential scanning calorimetry: a crystallization rate is less than 10%.

16 Claims, 3 Drawing Sheets

(51) Int. Cl.
    *B29C 55/14*    (2006.01)
    *B29C 55/18*    (2006.01)
    *B29K 67/00*    (2006.01)
    *B29K 105/26*   (2006.01)

(52) U.S. Cl.
    CPC ............ *B29C 55/146* (2013.01); *B29C 55/18* (2013.01); *B29K 2067/00* (2013.01); *B29K 2105/26* (2013.01); *B29K 2995/0041* (2013.01); *B29K 2995/0053* (2013.01)

(56)                References Cited

FOREIGN PATENT DOCUMENTS

| | | | |
|---|---|---|---|
| JP | 2000309052 | | 11/2000 |
| JP | 2005075905 | | 3/2005 |
| JP | 2016117178 | | 6/2016 |
| JP | 2019194339 | * | 11/2019 |
| WO | 2014021396 | | 2/2014 |
| WO | 2019066448 | | 4/2019 |
| WO | 2020095725 | | 5/2020 |
| WO | 2020203106 | | 10/2020 |

OTHER PUBLICATIONS

"Office Action of Taiwan Counterpart Application", dated Nov. 2, 2021, p. 1-p. 7.
"Search Report of Europe Counterpart Application", dated Dec. 17, 2021, p. 1-p. 18.

* cited by examiner

FIG. 3 ized from a melted state at a cooling rate of 20° C./min is

BIAXIALLY ORIENTED POLYESTER FILM AND MANUFACTURING METHOD THEREOF

CROSS-REFERENCE TO RELATED APPLICATION

This application claims the priority benefit of U.S. provisional application Ser. No. 63/129,522, filed on Dec. 22, 2020, and Taiwan application serial no. 110113065, filed on Apr. 12, 2021. The entirety of each of the above-mentioned patent applications is hereby incorporated by reference herein and made a part of this specification.

BACKGROUND

1. Technical Field

The disclosure relates to a polyester film and a manufacturing method thereof, and particularly relates to a biaxially oriented polyester film and a manufacturing method thereof.

Description of Related Art

Biaxially stretched polyester films are often used in magnetic tapes, insulating tapes, photo films, tracing films, packaging films, electrical insulating films, engineering papers, etc. Due to the rising awareness of environmental protection, waste polyester materials are often remade into polyester films. However, there is an urgent need to find a solution to the problem of how to achieve good quality in remade polyester films.

SUMMARY

The disclosure relates to a biaxially oriented polyester film and a manufacturing method thereof.

The biaxially oriented polyester film of the disclosure has a following physical property: when cooled from a molten state at a cooling rate of 20° C./min, an observed recrystallization temperature is 175° C.-200° C. The biaxially oriented polyester film is formed by a thick sheet before biaxially orienting that is melted and extruded by an extruder and then cooled and formed on a casting roll. The thick sheet before stretching has a following physical property as analyzed by differential scanning calorimetry: a crystallization rate is less than 10%.

In an embodiment of the disclosure, the biaxially oriented polyester film is formed of at least a polyester resin mixture. The polyester resin mixture includes an electrostatic pinning agent with metal ions and a polyester material. A weight concentration of the metal ions in the polyester resin mixture is 40 ppm to 50 ppm.

In an embodiment of the disclosure, the biaxially oriented polyester film is manufactured at least by an electrostatic pinning method. The electrostatic pinning method includes the following steps: providing the casting roll and an electrostatic device configured corresponding to the casting roll, forming the molten polyester resin mixture on the casting roll, and providing an electrostatic voltage between the casting roll and the electrostatic device.

In an embodiment of the disclosure, the metal ion is an alkali metal ion, an alkaline earth metal ion, or a combination thereof.

In an embodiment of the disclosure, the polyester material is at least made up of a recycled polyester material.

In an embodiment of the disclosure, a weight ratio of the recycled polyester material to the polyester resin mixture is greater than 80% and less than or equal to 100%.

In an embodiment of the disclosure, the polyester resin mixture further includes a slipping agent. A weight concentration of the slipping agent in the polyester resin mixture is 500 ppm to 3000 ppm.

The manufacturing method of biaxially oriented polyester film of the disclosure includes the following steps: providing a casting roll and an electrostatic device configured corresponding to the casting roll, extruding a molten polyester resin mixture on the casting roll, providing an electrostatic voltage between the casting roll and the electrostatic device so as to form a thick sheet, and bidirectional stretching the thick sheet so as to form a biaxially oriented polyester film.

The manufacturing method of biaxially oriented polyester film of the disclosure includes the following steps: forming a molten polyester resin mixture on the casting roll so as to form a thick sheet, where the thick sheet before stretching has a following physical property as analyzed by differential scanning calorimetry: a crystallization rate is less than 10%; and then biaxially orienting the thick sheet so as to form the biaxially oriented polyester film, where when the biaxially oriented polyester film is cooled from a molten state at a cooling rate of 20° C./min, an observed recrystallization temperature is 175° C.-200° C.

The manufacturing method of biaxially oriented polyester film of the disclosure includes the following steps: extruding a molten polyester resin mixture on a casting roll so as to form a thick sheet, and bidirectional stretching the thick sheet so as to form the biaxially oriented polyester film. The polyester resin mixture includes an electrostatic adhesive with metal ions and a polyester material, and a weight concentration of the metal ions in the polyester resin mixture is 40 ppm to 50 ppm.

Based on the above, the biaxially oriented polyester film of the disclosure may be made of the recycled polyester material. Moreover, the biaxially oriented polyester film of the disclosure has better quality.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

In the following detailed description, for the sake of illustration and not limitation, exemplary embodiments revealing specific details are set forth to provide a thorough understanding of various principles of the disclosure. However, it will be obvious to those skilled in the art that the disclosure may be practiced in other embodiments that depart from the specific details disclosed herein. In addition, descriptions of well-known devices, methods, and materials may be omitted so as not to obscure the description of various principles of the disclosure.

A range may be expressed herein as from "about" a specific value to "about" another specific value, and it may also be directly expressed as a specific value and/or to another specific value. When expressing such range, another embodiment includes from the one specific value and/or to another specific value. Similarly, when a value is expressed as an approximation by using the antecedent "about", it will be understood that the specific value forms another embodiment. It will be further understood that the endpoint of each range is obviously related to or independent of the other endpoint.

In this article, non-limiting terms (such may, can, for example, or other similar terms) are unnecessary or optional implementations, inclusions, additions or existences.

Unless otherwise defined, all terms (including technical terms and scientific terms) used herein have the same meanings commonly understood by those with ordinary knowledge in the art. It will also be understood that terms (such as those defined in commonly used dictionaries) should be interpreted as having meaning consistent with the meaning in the relevant technical context, and should not be interpreted in an idealized or overly formal sense, unless clearly defined as such herein.

[Recycled Polyester Material]

The recycling method of polyester materials includes, for example: collecting various types of waste polyester materials; corresponding classification may be made according to the type, color and/or used purpose of the aforementioned waste polyester materials. Then, the classified waste polyester materials may be compressed and packaged. After that, the packaged waste polyester materials may be transported to a waste treatment plant. The aforementioned waste polyester material may include recycled polyester bottles, for example, but the disclosure is not limited thereto.

The recycling method of polyester materials may further include: removing objects (such as bottle caps, labels and/or adhesives) on the waste polyester materials. Then, physically and mechanically crush the aforementioned waste polyester material. After that, use an appropriate method (such as: flotation) to separate the crushed polyester material. Afterwards, the crushed and separated waste polyester material may be dried so as to obtain the treated recycled polyester material.

In an embodiment, the recycled polyester material may also include, for example, treated recycled polyester material directly purchased.

In an embodiment, the recycled polyester material may also be further recycled (e.g. recycling the edge trims removed) through the method described below forming the biaxially oriented polyester film.

The recycled polyester material obtained by the above method may be further formed into recycled polyester chips by way of the following so as to proceed with subsequent film manufacturing processes.

It should be noted that the terms "polyester", "polyester material" and the like in the disclosure refer to any type of polyesters, especially aromatic polyesters, and herein particularly refer to polyesters derived from purified terephthalic acid (PTA) and ethylene glycol (EG) (namely, polyethylene terephthalate (PET)).

Moreover, the polyester herein may also be, for example, polytrimethylene terephthalate, polybutylene terephthalate, polyethylene naphthalate, or a combination of the foregoing. In the present embodiment, the polyester is preferably polytrimethylene terephthalate, polypropylene terephthalate, or a combination of the above. Furthermore, a copolymer may also be used, which specifically refers to a copolymer that may be obtained by using two or more dicarboxylic acids and/or two or more diol components.

[Manufacturing Method of Chemical Recycled Polyester Chips](Electrostatic Pinning Agent and/or Slipping Agent May be Included)

Figure 1:
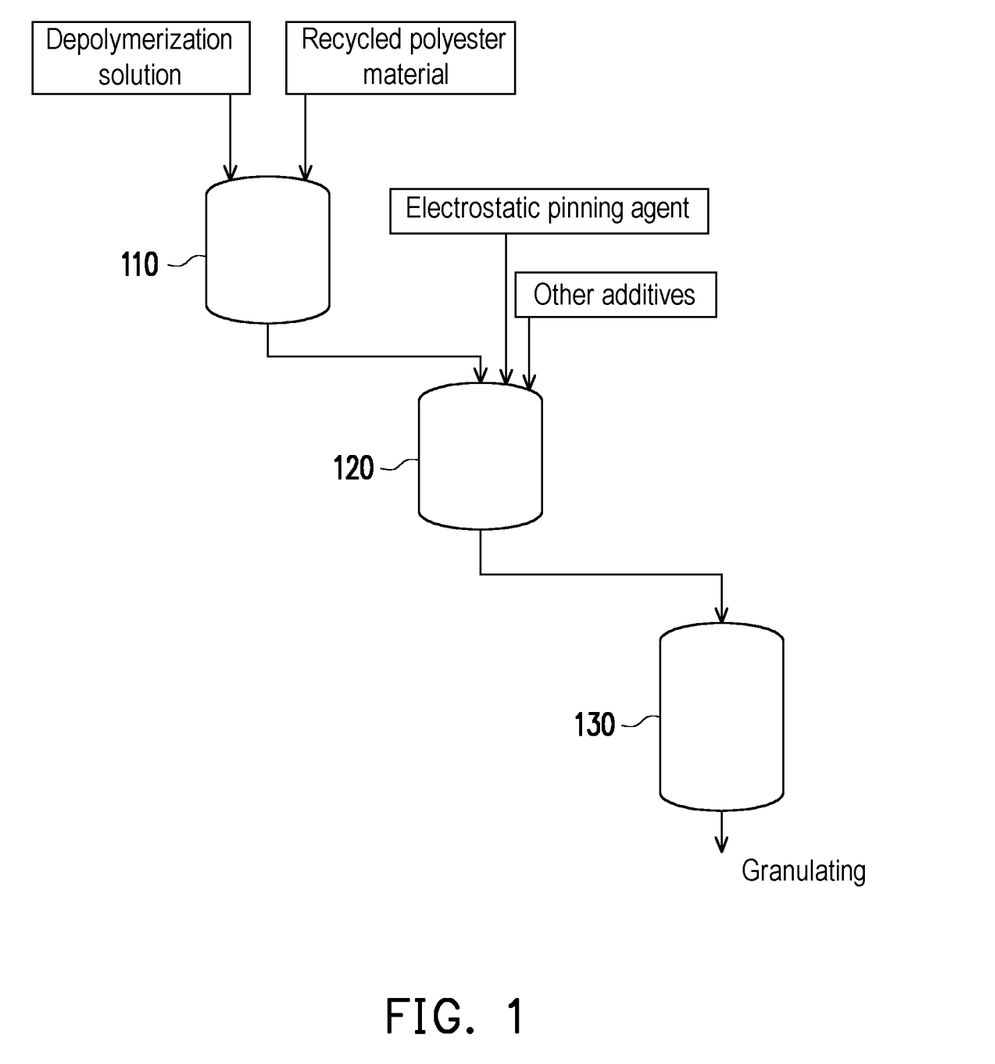
FIG. 1 is a schematic partial flow diagram of a manufacturing method of biaxially oriented polyester film according to an embodiment of the disclosure.

Step 1-1: referring to FIG. 1 for chemical depolymerization of the recycled polyester material. For example, the recycled polyester material and the depolymerization solution may be put into a depolymerization tank 110 for chemical depolymerization.

In general, the chemical depolymerization solution may sever the polyester molecules in the recycled polyester material, thereby achieving the effect of depolymerization. Moreover, a polyester composition with a shorter molecular chain and/or an ester monomer composed of a diacid unit and two diol units (such as bis(2-hydroxyethyl)terephthalate, BHET) may be obtained. That is, an average molecular weight of the mixture after chemical depolymerization is generally smaller than an average molecular weight of the recycled polyester material.

Furthermore, the disclosure does not limit the type of depolymerization solution. For example, hydrolysis may be performed by water. For another example, alcohols (such as methanol, ethanol, ethylene glycol, diethylene glycol or a mixture of the above) may be used for alcoholysis.

In an embodiment, the depolymerization solution is preferably alcohol. The more suitable alcoholysis solution may be ethylene glycol; one of the reasons may be that ethylene glycol may be the reactive monomer for the production of virgin polyester chips.

When the chemical depolymerization reaction is performed, a heating step may be appropriately performed. Generally speaking, heating may accelerate the progress of chemical reactions. For example, the recycled polyester material and ethylene glycol may be put into the depolymerization tank 110 for the alcoholysis reaction at a temperature of 200° C. to 230° C. for about three hours.

Step 1-2: Proceeding Esterification Reaction

The product after the aforementioned chemical depolymerization reaction is subjected to an esterification reaction. It is worth noting that in the disclosure, not all polyester materials need to be completely depolymerized.

For example, the product after the aforementioned chemical depolymerization reaction may be transferred to an esterification tank 120 for esterification reaction. The esterification reaction is generally a reversible reaction. Therefore, during the esterification reaction, the depolymerization solution and/or part of the products (such as alcohol and/or water) may be brought out by distillation. In this way, the amount or concentration of other products (such as polyester products) may be increased through the balance of chemical reactions.

In an embodiment, the product after the aforementioned chemical depolymerization reaction may be first filtered by a filter before being moved into the esterification tank 120, such that at least part of the impurities in the recycled polyester material may be eliminated, thereby reducing the concentration of non-polyester impurities. In an embodiment, the pore size of the filter may be between 1 μm and 10 μm.

After the aforementioned esterification reaction proceeds for a period of time, an electrostatic pinning agent may be added to the esterification tank 120. The electrostatic pinning agent may include a metal salt.

In an embodiment, the metal salt used for the electrostatic pinning agent may be a non-transition metal salt. In an embodiment, the metal salt used in the electrostatic pinning agent may be an alkali metal salt, an alkaline earth metal salt, or a combination of the above.

In an embodiment, the alkali metal salt may include a lithium salt, a sodium salt, a potassium salt, or a combination thereof. The lithium salt includes, for example, lithium acetate dihydrate ($CH_3COOLi \cdot 2H_2O$), the sodium salt includes, for example, sodium acetate trihydrate ($CH_3COONa \cdot 3H_2O$), and/or the potassium salt includes, for example, potassium acetate ($CH_3COOK$), but the disclosure is not limited thereto.

In an embodiment, the alkaline earth metal salt may include a magnesium salt. The magnesium salt includes, for example, magnesium acetate tetrahydrate (($CH_3COO)_2 Mg \cdot 4H_2O$), but the disclosure is not limited thereto.

In an embodiment, the electrostatic pinning agent may be dissolved in a solvent (such as ethylene glycol) first. Then, the aforementioned solution (namely the solvent in which at least part of the electrostatic pinning agent is dissolved) is added to the esterification tank 120. At this time, the material in the esterification tank 120 has lower viscosity ("lower viscosity", as compared to the polyester resin mixture formed later and/or the initial recycled polyester material), therefore may be easier to be mixed evenly. Furthermore, since the electrostatic pinning agent may exist in the esterification tank 120 in an ionic form (metal cation and corresponding anion), the dispersibility is better and/or correspondingly dielectric properties is better. In this way, the amount of electrostatic pinning agent added may be reduced.

In a possible embodiment, based on a total weight of the substances in the esterification tank 120, the electrostatic pinning agent may include 500 ppm of magnesium acetate tetrahydrate, 100 ppm of lithium acetate dihydrate, 100 ppm of sodium acetate trihydrate, and 100 ppm of potassium acetate.

In an embodiment, alkali metal ions and/or alkaline earth metal ions may catalyze thermal cracking of the polyester. Therefore, when there is more amount of addition, the color of the subsequently formed film (such as the biaxially oriented polyester film described later) will be correspondingly yellowish (for example, having higher b* value represented by CIE Lab 1976 color space). Generally speaking, when a film has higher b* value, the product thereof may be of lower value.

After proceeding the aforementioned esterification reaction for a period of time, other additives may be added to the esterification tank 120, but the disclosure is not limited thereto. Other additives may include slipping agents, stabilizers and/or polymerization catalysts.

The slipping agent may be in the form of granular. For example, the slipping agent may include silica particles, Calcium carbonate particles, Barium sulfate particles, polystyrene particles, silicone particles, acrylic particles, or a combination of the foregoing. In a possible embodiment, based on a total weight of the substances in the esterification tank 120, the slipping agent may include 5,000 ppm of silica particles with an average particle size of approximately 2.4 μm.

The stabilizer may include an acid. In a possible embodiment, based on a total weight of the substances in the esterification tank 120, the stabilizer may include 150 ppm of phosphoric acid.

The polymerization catalyst may include a metal salt. In a possible embodiment, based on the total weight of the substances in the esterification tank 120, the polymerization catalyst may include 350 ppm of antimony acetate.

Step 1-3: Proceeding Polymerization Reaction

The product after the aforementioned esterification reaction is subjected to a polymerization reaction.

For example, the product after the aforementioned esterification reaction may be moved into the polymerization tank 130 for polymerization reaction.

The aforementioned polymerization reaction may include a pre-polymerization reaction and/or a main polymerization reaction.

The prepolymerization reaction is, for example, to reduce the gas pressure in the tank within a period of time. For example, by pumping gas (e.g., air), the gas pressure in the tank may be reduced from normal pressure (such as about 760 torr) to 10 torr within 60 minutes; or, further drop below 10 torr (such as to 1 torr or close to 1 torr).

The main polymerization reaction is, for example, to heat the material in the tank under low pressure (for example, lower than the room pressure/normal pressure). For example, the polymerization reaction may be carried out at a temperature of 280° C. under the condition that the gas pressure in the tank is below 1 torr.

Step 1-4: Forming Polyester Chips

The aforementioned polymerization reaction is proceeded until the substance in the tank has the corresponding intrinsic viscosity (IV). Then, the gas pressure in the tank may be increased (for example, by filling nitrogen gas). Afterwards, the material in the tank is extruded and/or pelletized by the usual granulation method of general polymer chips to form polyester chips.

In the present embodiment, the intrinsic viscosity of the polyester chips formed by the aforementioned chemical remanufacturing is generally not greater than 0.65 dL/g; preferably, it may be between 0.40 dL/g and 0.65 dL/g; more preferably, it may be between 0.50 dL/g and 0.65 dL/g; for example, it may be about 0.600 dL/g.

In an embodiment, the polyester chips formed by the aforementioned chemical remanufacturing may be referred to as chemical recycled polyester chips).

[Manufacturing Method of Virgin Polyester Chips] (the Aforementioned Electrostatic Pinning Agent and/or Slipping Agent May be Included)

The manufacturing may be done by the same or similar method to the above [Manufacturing method of chemical recycled polyester chips], with the difference that the terephthalic acid and the ethylene glycol may be directly added to the esterification tank for esterification reaction. Moreover, the polyester chips formed by the above-mentioned method may (but not limited thereto) be virgin polyester chips containing an electrostatic pinning agent and/or slipping agent.

In the present embodiment, the intrinsic viscosity of the polyester chips formed by the above-mentioned method is usually not more than 0.65 dL/g; for example, it may be between 0.40 dL/g and 0.65 dL/g; for example, it may be further between 0.50 dL/g and 0.65 dL/g; for example, it may reach 0.600 dL/g.

In an embodiment, the polyester chips formed in the above-mentioned manner may be referred to as virgin polyester chips.

[Manufacturing Method of Physical Recycled Polyester Chips I] (the Aforementioned Electrostatic Pinning Agent and/or Slipping Agent May be Included)

In the present embodiment, the recycled polyester material may be melted such that it appears in a molten state. Then, the recycled polyester material in the molten state may be filtered through a filter so as to remove solid impurities in the recycled polyester material. After that, an extruder (such as a commercially available single screw extruder; SSE), twin screw extruder (TSE) or other similar screw extruders (but not limited thereto) may be used so as to extrude and granulate the filtered recycled polyester material to form physical recycled polyester chips I.

In an embodiment, before the recycled polyester material is melted, the recycled polyester material may be physically and mechanically crushed, so as to reduce the time and/or energy consumption required for melting the recycled polyester material.

On the other hand, the aforementioned method is to reshape the recycled polyester material through the steps of cutting, melting, filtering and extruding. In other words, in general, physically recycled polyester chips I are made by rearranging polyester molecules in recycled polyester materials.

In the present embodiment, since in the aforementioned physical remanufacturing process, the polyester molecules of the recycled polyester material are generally only rearranged (that is, basically not reorganized), the components originally present in the recycled polyester material (such as electrostatic pinning agents, slipping agents, stabilizers and/or polymerization catalysts) will still be present in a physical recycled polyester chips I. In other words, some of the characteristics of the physical recycled polyester chips I may be the same or similar to some of the characteristics of the originally used recycled polyester material.

In an embodiment, in general, an average molecular weight of the recycled polyester material during the physical remanufacturing process may not change much. In other words, the viscosity of the recycled polyester material in the molten state may be higher (that is, having lower fluidity). Therefore, if a filter with a too small pore size is used, the filtration efficiency may be reduced. In an embodiment, the pore size of the filter is preferably between 10 μm and 100 μm, but the disclosure is not limited thereto.

The physical recycled polyester chips I produced by the aforementioned physical remanufacturing usually have a relatively high intrinsic viscosity. In the present embodiment, the intrinsic viscosity of the physical recycled polyester chips I is usually not less than 0.60 dL/g; for example, it may be between 0.65 dL/g and 0.90 dL/g; for example, it may be further between 0.65 dL/g and 0.80 dL/g; for example, it may be about 0.68 dL/g.

In an embodiment, the polyester chips formed by the aforementioned physical remanufacturing may be referred to as physical recycled polyester chips.

In an embodiment, the intrinsic viscosity of the physical recycled polyester chips may be adjusted through solid-state polymerization. However, by solid-state polymerization, the intrinsic viscosity of the physical recycled polyester chips may be easily increased, but cannot be reduced. Furthermore, usual film-making process usually has certain limitations for the intrinsic viscosity range of the polyester chips. Therefore, using only physical recycled polyester chips I is usually more suitable for blowing process and spinning process, but may be less suitable for film making process.

[Manufacturing Method of Physical Recycled Polyester Chips II] (the Aforementioned Electrostatic Pinning Agent and/or Slipping Agent May be Included)

The manufacturing may be done by the same or similar method to the above [manufacturing method of physical recycled polyester chips I], with the difference that a corresponding feeder may be added to the extruder so as to mix additives (such as electrostatic pinning agent and/or slipping agent).

For example, depending on the type and/or amount of additives (such as electrostatic pinning agent or slipping agent, but not limited thereto), at least one feeder (such as a side feeder) may be added to the twin screw extruder. The feeder may be a loss-in-weight feeder equipped with a loss-in-weight meter. The aforementioned feeder may also be a common commercially available device and/or optional accessory. In this way, when extruding the recycled polyester material, the corresponding additives may be mixed in by the feeder according to the designed addition amount and/or concentration ratio.

In an embodiment, depending on the type of additives and/or the amount of additives, some properties of recycled polyester chips (such as intrinsic viscosity, electrostatic pinning effect, slippage, etc., but not limited thereto) may be adjusted accordingly.

In an embodiment, the polyester chips formed by the aforementioned physical remanufacturing may be referred to as physical recycled polyester chips.

In an embodiment, based on a total weight of recycled polyester chips, 1,000 ppm of magnesium acetate tetrahydrate, 200 ppm of lithium acetate dihydrate, 200 ppm of sodium acetate trihydrate, 200 ppm of potassium acetate, and 5,000 ppm of silica with an average chip size of about 2.4 μm may be included.

[Manufacturing Method of Biaxially Oriented Polyester Film]

In the present embodiment, at least one of the above-mentioned polyester chips (such as the above-mentioned chemical recycled polyester chips, the above-mentioned virgin polyester chips, the above-mentioned physical recycled polyester chips I or the above-mentioned physical recycled polyester chips II) may be used directly or mixed in an appropriate ratio according to the design requirements.

In an embodiment, the polyester chips may be dried by heating and/or low pressure. For example, the polyester chips may be vacuum dried at about 160° C. for 4 hours.

Figure 2:
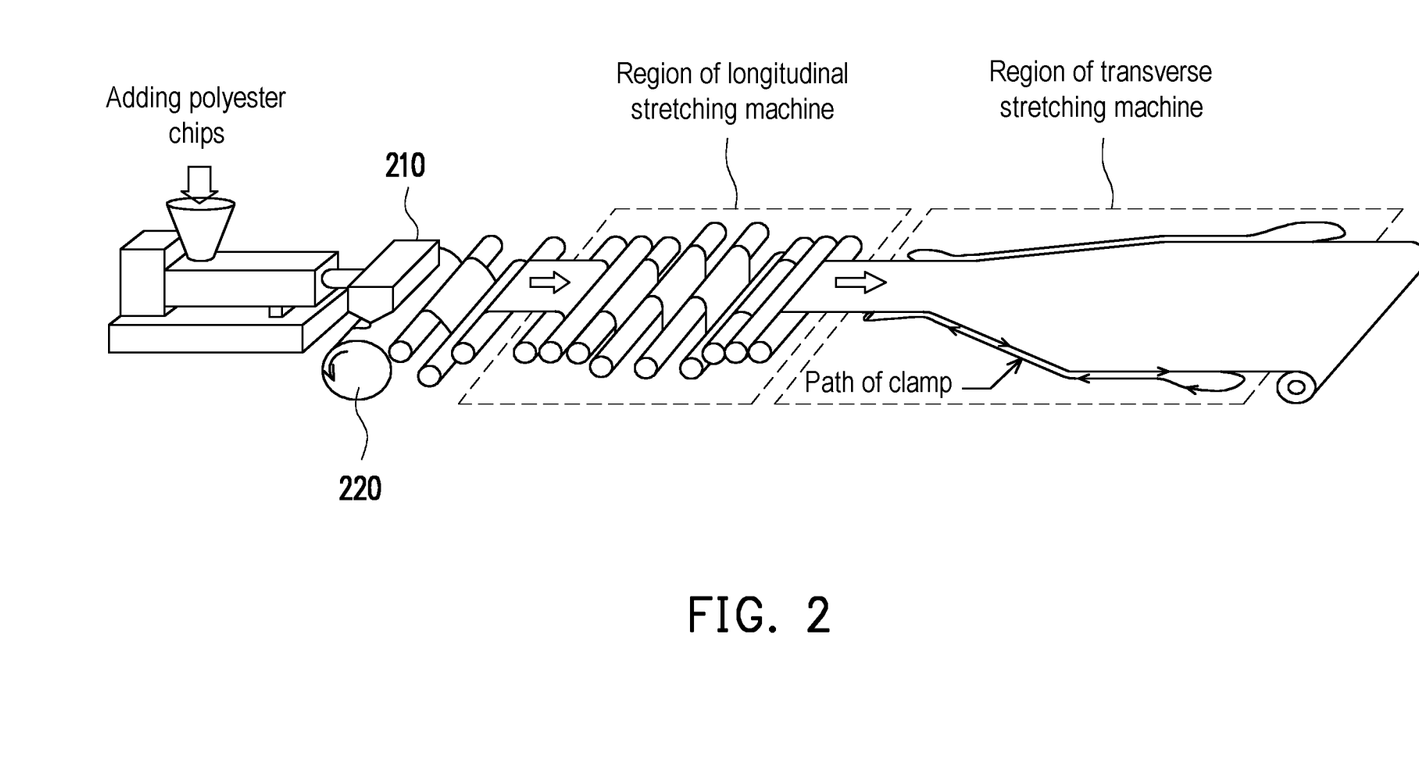
FIG. 2 is a partial perspective diagram of an equipment for manufacturing biaxially oriented polyester film according to an embodiment of the disclosure.
Figure 3:
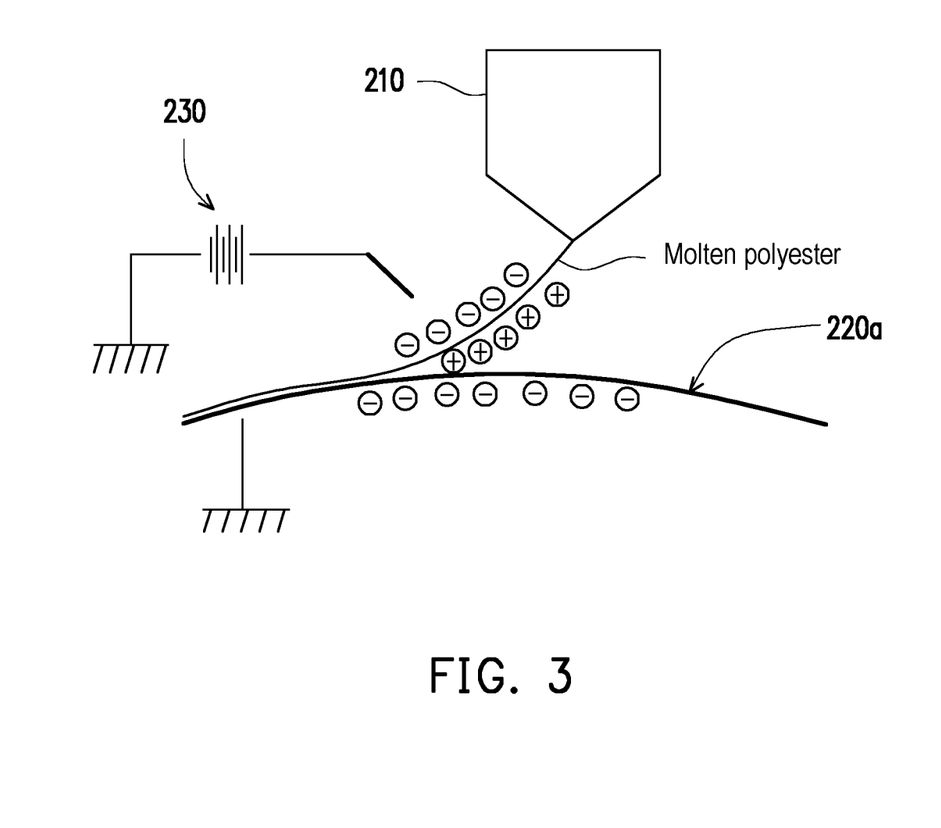
FIG. 3 is a partial schematic side diagram of an equipment for manufacturing biaxially oriented polyester film according to an embodiment of the disclosure.

Then, the polyester chips (which may be dried polyester chips, but not limited thereto) are heated to melt and extruded. For example, the polyester chips may be melted by an extruder (such as a commercially available single screw extruder, but not limited thereto) at about 280° C., and the molten polyester may be removed from a die (such as T-Dies) 210 is squeezed out or extruded.

After being squeezed out or extruded from the die 210, the molten polyester may drop onto a casting roll 220. Moreover, an electrostatic device 230 corresponding to the casting roll 220 may be powered on, such that the electrostatic device 230 has a corresponding high potential, and the casting roll 220 has a corresponding low potential (such as a ground potential). Therefore, a corresponding static voltage may be provided between the electrostatic device 230 and the casting roll 220. Of course, the potentials of the casting roll 220 and the electrostatic device 230 may be adjusted according to design requirements (for example, the electrostatic device 230 has a corresponding low potential and the casting roll 220 has a corresponding high potential).

In the present embodiment, the potential difference between the casting roll 220 and the electrostatic device 230 is usually greater than or equal to 1 kilovolt (kV); for example, it may be greater than or equal to 2 kV; for example, it may be greater than or equal to 3 kV and greater than or equal to 5 kV. The casting roll 220 may be used to cool the polyester. Herein, the sheet after cooling and forming may be referred to as a thick sheet.

In the present embodiment, since at least one kind of polyester chips used may include an electrostatic pinning agent, by the electrostatic voltage between the electrified electrostatic device 230 and the casting roll 220, the polyester (which may still be in a molten state; or, partially cooled and becomes viscous or flakes) may be more closely attached to a surface 220a of the casting roll 220. In other words, the polyester may be cooled faster and more uniformly, and the polyester molecules therein may have a lower crystallinity and a more uniform thickness. In this way, the formed thick sheet or the corresponding biaxially oriented polyester film may have better properties (for example, the film haze may be lower, the thickness uniformity may be higher, and/or it may be less likely to break).

Afterwards, the thick sheet may be subjected to the corresponding bidirectional stretching step by the usual method of general bidirectional stretching polyester film.

For example, the unstretched thick sheet may be first guided into a longitudinal stretching machine for longitudinal stretching so to form a corresponding film (namely a thick sheet that has been stretched longitudinally). Then, the film may be guided into a transverse stretching machine so as to be transversely stretched to form the biaxially oriented polyester film (namely a film that has been stretched transversely).

In detail, for example, the unstretched thick sheet may be guided into a longitudinal stretching machine. In the longitudinal stretching machine, the unstretched thick sheet may be preheated to 80° C. through multiple rollers that may be used for heating, and then heated with infrared rays at a longitudinal stretching point. While infrared heating, through the speed difference between two rollers, the thick sheet may be stretched to about 3.5 times in a length direction parallel to the conveying direction (which may be referred to as the longitudinal direction; MD). The longitudinally stretched thick sheet (which may be referred to as film) may be cooled by rollers (unlimited number) (for example, cooled to about 30° C.). Then, in a width direction of the film (namely the other direction perpendicular to the length direction, which may be referred to as transverse direction; TD), two ends of the film may be clamped by clamps. The film held by the clamps may be further guided into the transverse stretching machine. In the transverse stretching machine, the film clamped by the clamps may be first preheated to about 90° C. in the preheating zone. Then, the film is further heated to about 100° C. and stretched to about 4.0 times in the width direction. After that, the transversely stretched film may be heated to about 230° C. for heat setting.

Through the above-mentioned steps, the manufacture of biaxially oriented polyester film of the present embodiment has been substantially completed.

In an embodiment, according to design requirements, after the transverse stretching, a part of the film may be removed (for example, the edge trims may be removed).

The biaxially oriented polyester film may be stored by winding or further sold and/or used.

EXAMPLES AND COMPARATIVE EXAMPLES

Examples and comparative examples are shown below so explain the disclosure in detail, but the disclosure is not at all limited by the following examples.

The respective embodiments and comparative examples may show corresponding biaxially oriented polyester film formed by the above-mentioned method, with the difference in that the proportion of polyester chips used is adjusted such that the formed biaxially oriented polyester film has corresponding metal ion concentration and slipping agent concentration (expressed as $SiO_2$ concentration).

The biaxially stretched polyester films of [Example 1] to [Example 4] and [Comparative Example 1] to [Comparative Example 4] in [Table 1] are evaluated. What is evaluated includes color of 10 stacked biaxially oriented polyester films (expressed as "color b* of 10 films" in [table 1]), haze of the biaxially oriented polyester film (expressed as "film haze (%)" in [table 1]), recrystallization temperature of the biaxially oriented polyester film (expressed as "recrystallization temperature Tc(20) (° C.)" in [table 1]), and film rupture rate of the biaxially oriented polyester film (expressed as "film rupture rate (times/24 hours)" in [table 1]), and crystallization rate of the thick sheet used to form the biaxially oriented polyester film (expressed as "crystallization rate of the thick sheet after cooling and forming" in [table 1]).

For color test, b* value of CIE 1976 color space may be analyzed by the color difference meter ND300A (hunter method) of Tokyo Denshoku Co., Ltd.

For haze test, the haze of the polyester film in the following embodiments may be tested by the haze meter (Model TC-HIII) of Tokyo Denshoku Co., Ltd.; the method conforms to the JIS K7705 specification.

Recrystallization temperature or crystallization rate may be analyzed by differential scanning calorimetry (DSC) according to ISO 11357-3:2013 (determination of temperature and enthalpy of melting and crystallization) standard.

Film rupture rate may be the number of film ruptures per unit time under a same stretching condition (including the aforementioned longitudinal stretching or transverse stretching).

TABLE 1

|  | Embodiment 1 | Embodiment 2 | Embodiment 3 | Embodiment 4 | Comparative example 1 | Comparative example 2 | Comparative example 3 | Comparative example 4 |
| --- | --- | --- | --- | --- | --- | --- | --- | --- |
| Proportion of virgin polyester chips | 0% | 0% | 0% | 15% | 20% | 30% | 40% | 0% |
| Proportion of chemical recycled chips | 40% | 25% | 20% | 20% | 0% | 0% | 0% | 0% |
| Proportion of physical recycled chips I | 60% | 70% | 70% | 65% | 80% | 70% | 60% | 80% |

TABLE 1-continued

|  | Embodiment 1 | Embodiment 2 | Embodiment 3 | Embodiment 4 | Comparative example 1 | Comparative example 2 | Comparative example 3 | Comparative example 4 |
|---|---|---|---|---|---|---|---|---|
| Proportion of physical recycled chips II | 0% | 5% | 10% | 0% | 0% | 0% | 0% | 20% |
| Total proportion of recycle chips | 100% | 100% | 100% | 85% | 80% | 70% | 60% | 100% |
| Electrostatic pinning agent Metal ion concentration (ppm) | 48 | 42 | 48 | 42 | 24 | 36 | 48 | 48 |
| $SiO_2$ concentration (ppm) | 800 | 750 | 900 | 1150 | 1000 | 1500 | 4000 | 1000 |
| color b* of 10 films | 6 | 4 | 5 | 1 | 1 | 3 | 2 | 10 |
| Film haze (%) | 2.5 | 2 | 2.8 | 4.0 | 2.3 | 5.6 | 7.3 | 4.6 |
| Recrystallization temperature Tc (20) (° C.) | 185 | 195 | 198 | 177 | 185 | 170 | 150 | 185 |
| Crystallization rate of thick sheet after cooling and forming | 2.0% | 5.0% | 6.5% | 1.5% | 20% | 12% | 1.0% | 18% |
| Film rupture rate (times/24 hours) | 0.4 | 0.5 | 0.3 | 0.2 | 2.1 | 1.2 | 0.2 | 2 |

In the foregoing embodiment or comparative example, the evaluation method of the electrostatic pinning effect may include: by differential scanning calorimetry (DSC), heating 10 milligrams (mg) of the thick sheet after being cooled and formed until melting, at a heating rate of 20° C./min, and then calculating the crystallization rate by the following formula: C=(A1−A2)/B. C is a crystallinity of the thick sheet sample after cooling and forming. A1 is a melting point (Tm) endothermic peak area. A2 is an exothermic peak area of crystallization temperature (Tch). B is a theoretical value of complete crystallization (i.e. 100% crystallization) (approximately 140 J/g).

In generally, the lower the crystallization rate, the better the electrostatic pinning effect.

In some possible examples, there are often more impurities that cannot be removed due to the high proportion of recycled materials added. Therefore, the formed film (e.g. thick sheet) has more crystals (e.g. higher crystallization rate), and/or higher recrystallization temperature (Tc), which often results in a narrower range of process conditions, higher crystallinity after cooling and forming, lower production speed, lower stretching (for example, it is more difficult to perform good longitudinal stretching or transverse stretching) and/or higher likelihood to film rupture.

In the above-mentioned embodiments (such as Embodiment 1 to Embodiment 4, but not limited thereto), the manufacturing may be done by the same or similar to the aforementioned method [Manufacturing method of chemical recycled polyester chips]. Furthermore, an appropriate amount of electrostatic pinning agent is added during the manufacturing process of chemical recycled polyester chips. Moreover, since the electrostatic pinning agent is dissolved in a solvent and added/present in an ionic form (metal cation and corresponding anion) in the reaction tank (such as the esterification tank), a method similar to homogenous mixture, it is easier to be mixed and/or easier to be mixed uniformly, and the dispersibility thereof is better and/or correspondingly dielectric properties are better. Therefore, the addition amount of the electrostatic pinning agent may be reduced, and/or there may be a better electrostatic pinning effect in the subsequent manufacturing process. In this way, when the polyester resin mixture containing chemical recycled polyester chips is cast on the cooling casting roll, the molten polyester polymer may have a better cooling effect, and the generation of crystallization may be reduced (for example, the crystallization rate is reduced).

Similarly, when the electrostatic pinning agent is added by way of extruder mixing, it will be similar to being added by way of a heterogeneous mixture. Therefore, compared with homogenous mixture, the electrostatic pinning agent may have poorer dispersibility and/or it is more difficult to form an ionic state. Therefore, it is often necessary to increase the amount of electrostatic pinning agent added in order to achieve the expected electrostatic pinning effect.

Moreover, alkali metal salts or alkaline earth metal salts may be good electrostatic pinning agents. However, alkali metal ions and/or alkaline earth metal ions may catalyze thermal cracking of the polyester. Therefore, the more the amount of alkali metal salt or alkaline earth metal salt is added, the subsequently formed film will be correspondingly yellowish, and the product thereof may be of lower value.

In summary, the biaxially oriented polyester film of the disclosure may be made of recycled polyester materials. Moreover, the biaxially oriented polyester film of the disclosure has better quality.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A biaxially oriented polyester film, wherein the biaxially oriented polyester film has a following physical property:
    when cooled from a molten state at a cooling rate of 20° C./min, an observed recrystallization temperature (Tc (A)) is 177° C.-200° C., and the biaxially oriented polyester film is formed by a thick sheet before bidirectional stretching that is melted and extruded by an extruder and then cooled and formed on a casting roll, wherein the thick sheet before stretching has a following physical property as analyzed by differential scanning calorimetry:
    a crystallization rate is less than 10%.

2. The biaxially oriented polyester film as described in claim 1, formed of at least a polyester resin mixture, wherein the polyester resin mixture comprises:
an electrostatic pinning agent with metal ions and a polyester material, and a weight concentration of the metal ions of the electrostatic pinning agent in the polyester resin mixture is 40 ppm to 50 ppm.

3. The biaxially oriented polyester film as described in claim 2, manufactured at least by an electrostatic pinning method, and comprising:
providing the casting roll and an electrostatic device configured corresponding to the casting roll; and
forming the molten polyester resin mixture on the casting roll, and providing an electrostatic voltage between the casting roll and the electrostatic device.

4. The biaxially oriented polyester film as described in claim 2, wherein the metal ion is an alkali metal ion, an alkaline earth metal ion, or a combination thereof.

5. The biaxially oriented polyester film as described in claim 2, wherein the polyester material is at least made up of a recycled polyester material.

6. The biaxially oriented polyester film as described in claim 5, wherein a weight ratio of the recycled polyester material to the polyester resin mixture is greater than 80% and less than or equal to 100%.

7. The biaxially oriented polyester film as described in claim 2, wherein the polyester resin mixture further comprises a slipping agent, and a weight concentration of the slipping agent in the polyester resin mixture is 500 ppm to 3000 ppm.

8. The biaxially oriented polyester film as described in claim 3, wherein the electrostatic voltage between the casting roll and the electrostatic device is greater than or equal to 1 kilovolt.

9. The biaxially oriented polyester film as described in claim 8, wherein the metal ion is an alkali metal ion, an alkaline earth metal ion, or a combination thereof.

10. The biaxially oriented polyester film as described in claim 8, wherein the polyester material is at least made up of a recycled polyester material.

11. The biaxially oriented polyester film as described in claim 10, wherein a weight ratio of the recycled polyester material to the polyester resin mixture is greater than 80% and less than or equal to 100%.

12. The biaxially oriented polyester film as described in claim 8, wherein the polyester resin mixture further comprises a slipping agent, and a weight concentration of the slipping agent in the polyester resin mixture is 500 ppm to 3000 ppm.

13. The biaxially oriented polyester film as described in claim 8, wherein the thick sheet is an unstretched sheet formed after cooling the molten polyester resin mixture on the casting roll and before stretching for forming the biaxially oriented polyester film.

14. The biaxially oriented polyester film as described in claim 13, wherein a thickness of the thick sheet is greater than a thickness of the biaxially oriented polyester film.

15. The biaxially oriented polyester film as described in claim 1, wherein the thick sheet is an unstretched sheet formed after cooling the molten polyester resin mixture on the casting roll and before stretching for forming the biaxially oriented polyester film.

16. The biaxially oriented polyester film as described in claim 15, wherein a thickness of the thick sheet is greater than a thickness of the biaxially oriented polyester film.

* * * * *